US011515771B2

(12) United States Patent
Bilgin et al.

(10) Patent No.: US 11,515,771 B2
(45) Date of Patent: Nov. 29, 2022

(54) ALTERNATING-CURRENT DRIVEN, SALIENT-TEETH RELUCTANCE MOTOR WITH CONCENTRATED WINDINGS

(71) Applicant: Enedym Inc., Hamilton (CA)

(72) Inventors: Berker Bilgin, Hamilton (CA); Rong Yang, Hamilton (CA); Nigel Schofield, Hamilton (CA); Ali Emadi, Burlington (CA)

(73) Assignee: Enedym Inc., Hamilton (CA)

( * ) Notice: Subject to any disclaimer, the term of this patent is extended or adjusted under 35 U.S.C. 154(b) by 9 days.

(21) Appl. No.: 15/938,708

(22) Filed: Mar. 28, 2018

(65) Prior Publication Data
US 2018/0287473 A1 Oct. 4, 2018

Related U.S. Application Data

(60) Provisional application No. 62/477,611, filed on Mar. 28, 2017.

(51) Int. Cl.
*H02K 37/04* (2006.01)
*H02K 21/44* (2006.01)
(Continued)

(52) U.S. Cl.
CPC .......... *H02K 19/103* (2013.01); *H02K 1/246* (2013.01); *H02K 3/28* (2013.01); *H02K 19/10* (2013.01);
(Continued)

(58) Field of Classification Search
CPC ...... H02K 19/103; H02K 37/04; H02K 21/44; H02K 1/246; H02K 19/24; H02K 19/10; H02K 3/28; H02P 25/092
(Continued)

(56) References Cited

U.S. PATENT DOCUMENTS 4,995,159 A * 2/1991 Hancock .............. H02K 19/103
29/596
5,838,087 A * 11/1998 Tang .................... H02K 19/103
310/168
(Continued)

FOREIGN PATENT DOCUMENTS

JP 6581063 B2 * 9/2019 ............ H02P 25/098

OTHER PUBLICATIONS

Pavel Ponomarev et al., "Current Linkage Harmonics and Air-Gap Harmonic Leakage Inductance of Tooth-Coil Permanent-Magnet Synchronous Machines", IEEE 2013.*
(Continued)

*Primary Examiner* — John K Kim
(74) *Attorney, Agent, or Firm* — Bereskin & Parr LLP/S.E.N.C.R.L., s.r.l.; Stephen Beney

(57) ABSTRACT

A reluctance motor has salient teeth on both the stator and the rotor. The reluctance motor includes electrical coils that are usable to generate magnetic flux to drive rotation of the rotor. Concentrated coil windings are wound around each stator tooth. The electrical coils are arranged across all the stator teeth of the reluctance motor to enable the reluctance motor to be driven by alternating current. The electrical coils are arranged so that, when excited with alternating current, the number of magnetic half-poles is equal to the number of teeth on the rotor. The reluctance machine can operate using an inverter instead of an asymmetric bridge.

10 Claims, 15 Drawing Sheets

(51) Int. Cl.
 H02K 1/24 (2006.01)
 H02K 19/24 (2006.01)
 H02K 19/10 (2006.01)
 H02K 3/28 (2006.01)
 H02P 25/092 (2016.01)

(52) U.S. Cl.
 CPC ............ H02K 19/24 (2013.01); H02K 21/44 (2013.01); H02K 37/04 (2013.01); H02P 25/092 (2016.02)

(58) Field of Classification Search
 USPC ...................................................... 310/49.43
 See application file for complete search history.

(56) References Cited

U.S. PATENT DOCUMENTS

| | | | | |
|---|---|---|---|---|
| 6,078,122 | A * | 6/2000 | Tang | H02K 19/103 310/162 |
| 2002/0125783 | A1* | 9/2002 | Morinigo | H02K 19/103 310/179 |
| 2004/0070354 | A1* | 4/2004 | Krueger | H02P 6/28 318/400.32 |
| 2009/0167223 | A1* | 7/2009 | Goto | H02P 27/08 318/400.17 |
| 2011/0181135 | A1* | 7/2011 | Pollock | H02P 8/22 310/49.46 |
| 2011/0279073 | A1* | 11/2011 | Wichert | H02P 1/46 318/400.33 |
| 2012/0169267 | A1* | 7/2012 | Nashiki | H02K 19/103 310/46 |
| 2013/0015727 | A1 | 1/2013 | Iki | |
| 2015/0162788 | A1 | 6/2015 | Tsai et al. | |
| 2015/0288264 | A1* | 10/2015 | Tojima | H02P 25/092 318/701 |
| 2016/0049835 | A1 | 2/2016 | Fukumoto et al. | |
| 2016/0056673 | A1 | 2/2016 | Buttner et al. | |
| 2016/0105135 | A1* | 4/2016 | Torrey | H02P 25/092 318/400.02 |
| 2016/0141923 | A1 | 5/2016 | Frolich | |
| 2017/0093257 | A1* | 3/2017 | Hirata | H02P 7/298 |
| 2018/0102722 | A1* | 4/2018 | Deguchi | H02K 5/04 |
| 2018/0287473 | A1* | 10/2018 | Bilgin | H02K 3/28 |

OTHER PUBLICATIONS

Faiz et al., "Time-Stepping Finite-Element Analysis of Dynamic Eccentricity Fault in a Three-Phase Salient Pole Synchronous Generator", Progress In Electromagnetics Research B, vol. 20, 263-284, 2010.*

* cited by examiner

ALTERNATING-CURRENT DRIVEN, SALIENT-TEETH RELUCTANCE MOTOR WITH CONCENTRATED WINDINGS

PRIOR APPLICATION

This application claims the benefit of U.S. Provisional Patent Application No. 62/477,611 filed on Mar. 28, 2017, which is incorporated by reference herein in its entirety.

FIELD OF THE INVENTION

The described embodiments relate to reluctance machines, and in particular, to reluctance machines having salient teeth with concentrated windings.

BACKGROUND

Electric machines have been applied as motors and generators in a wide range of industries for more than a century. A reluctance machine is an electric machine in which torque is produced by the tendency of the movable part of the machine to move into a position where the inductance of an excited winding is maximized. A switched reluctance machine is a type of a reluctance machine where the windings are energized as a function of the position of the movable part of the machine.

Conventional switched reluctance machines typically include one stator and one rotor, where the stator includes windings on the stator teeth to generate electromagnetic field and the rotor in the electromagnetic field has the tendency to align with the stator to achieve maximum inductance. The rotor rotates as long as the stator excitation switches successfully. Accordingly, the energized windings on the stator teeth need to be carefully controlled to facilitate effective operation of the electric machine.

SUMMARY

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

In an aspect of the disclosure, there is provided a reluctance motor which has salient teeth on both the stator and the rotor. The reluctance motor includes electrical coils that are usable to generate magnetic flux to drive rotation of the rotor. Concentrated coil windings are wound around each stator tooth. The electrical coils are arranged across all the stator teeth of the reluctance motor to enable the reluctance motor to be driven by alternating current. The electrical coils are arranged so that, when excited with alternating current, the number of magnetic half-poles is equal to the number of teeth on the rotor. The reluctance machine may operate using an inverter instead of an asymmetric bridge, which can reduce the cost and complexity of the reluctance motor control system.

The described embodiments provide in an aspect, a reluctance motor comprising: a stator having a plurality of salient stator teeth protruding radially from the stator; a rotor concentrically disposed with the stator, the rotor having a plurality of salient rotor teeth protruding radially from the rotor towards the stator teeth; a plurality of electrical coils wound about the stator teeth, the plurality of electrical coils including a plurality of separate phase coils defining a plurality of phases of the reluctance motor; a multi-phase inverter; a power source coupled to the plurality of electrical coils by the inverter; and a controller operable to energize the electrical coils using power supplied from the power source via the inverter wherein the electrical coils are energized using an alternating current; wherein each phase coil has a phase coil input and a phase coil output that are coupled to the power source by the inverter; wherein each phase coil includes a plurality of phase winding sections and at least one linking sections, wherein each phase winding section is wound about a different one of the stator teeth, and the phase winding sections are joined in a sequence by the plurality of linking sections to form a current path between the phase coil input and the phase coil output; wherein the plurality of electrical coils define a current linkage waveform of the reluctance motor that includes a number of half-cycles equal to the number of salient rotor teeth.

In some embodiments, the alternating current may have a sinusoidal waveform.

In some embodiments, at least one phase coil may include a pair of adjacent phase winding sections, the adjacent phase winding sections being wound about adjacent stator teeth.

In some embodiments, the pair of adjacent phase winding sections may include a first phase winding section that is wound about a first corresponding stator tooth to define a first direction of current flow around the first corresponding stator tooth and a second phase winding section that is wound about a second corresponding stator tooth adjacent to the first corresponding stator tooth to define a second direction of current flow about the second corresponding stator tooth, wherein the first direction of current flow is opposite from the second direction of current flow.

In some embodiments, the plurality of separate phase coils include three separate phase coils defining three phases of the reluctance motor and the inverter is a three-phase inverter.

The described embodiments provide in an aspect, a reluctance motor comprising: a stator having a plurality of salient stator teeth; a rotor concentrically disposed with the stator, the rotor having a plurality of salient rotor teeth; and a plurality of electrical coils, the plurality of electrical coils including a plurality of separate phase coils defining a plurality of phases of the reluctance motor; wherein each phase coil has a phase coil input and a phase coil output that are coupled to a power source of the reluctance motor; wherein each phase coil includes a plurality of phase winding sections and at least one linking sections, wherein each phase winding section is wound about a different one of the stator teeth, and the phase winding sections are joined in a sequence by the plurality of linking sections to form a current path between the phase coil input and the phase coil output; wherein the plurality of electrical coils define a current linkage waveform of the reluctance motor that includes a number of half-cycles equal to the number of salient rotor teeth.

In some embodiments, the motor may further comprise a controller operable to energize the electrical coils using power supplied from the power source wherein the electrical coils are energized using an alternating current.

In some embodiments, the alternating current may have a sinusoidal waveform.

In some embodiments, at least one phase coil may include a pair of adjacent phase winding sections, the adjacent phase winding sections being would about adjacent stator teeth.

In some embodiments, the pair of adjacent phase winding sections may include a first phase winding section that is wound about a first corresponding stator tooth to define a first direction of current flow around the first corresponding stator tooth and a second phase winding section that is wound about a second corresponding stator tooth adjacent to the first corresponding stator tooth to define a second direction of current flow about the second corresponding stator tooth, wherein the first direction of current flow is opposite from the second direction of current flow.

In some embodiments, the motor may further comprise a multi-phase inverter coupling the plurality of phase coils to the power source.

In some embodiments, the plurality of separate phase coils may include three separate phase coils defining three phases of the reluctance motor.

The described embodiments provide in an aspect, a reluctance motor comprising: a stator having a plurality of salient stator teeth; a rotor concentrically disposed with the stator, the rotor having a plurality of salient rotor teeth; a plurality of electrical coils, the plurality of electrical coils including a plurality of separate phase coils defining a plurality of phases of the reluctance motor; and a controller operable to energize the electrical coils using power supplied from a power source coupled to the plurality of electrical coils, wherein the electrical coils are energized using an alternating current; wherein each phase coil has a phase coil input and a phase coil output that are coupled to the power source; and wherein each phase coil includes a plurality of phase winding sections and a plurality of linking sections, wherein each phase winding section is wound about a different one of the stator teeth, and the phase winding sections are joined in a sequence by the plurality of linking sections to form a current path between the phase coil input and the phase coil output.

In some embodiments, the alternating current may have a sinusoidal waveform.

In some embodiments, at least one phase coil may include a pair of adjacent phase winding sections, the adjacent phase winding sections being would about adjacent stator teeth.

In some embodiments, the pair of adjacent phase winding sections may include a first phase winding section that is wound about a first corresponding stator tooth to define a first direction of current flow around the first corresponding stator tooth and a second phase winding section that is wound about a second corresponding stator tooth adjacent to the first corresponding stator tooth to define a second direction of current flow about the second corresponding stator tooth, wherein the first direction of current flow is opposite from the second direction of current flow.

In some embodiments, the motor may further comprise a multi-phase inverter coupling the plurality of phase coils to the power source.

In some embodiments, the plurality of separate phase coils may include three separate phase coils defining three phases of the reluctance motor.

DRAWINGS

For a better understanding of the various embodiments described herein, and to show more clearly how these various embodiments may be carried into effect, reference will be made, by way of example, to the accompanying drawings which show at least one example embodiment and which will now be briefly described.

DETAILED DESCRIPTION

Figure 1:
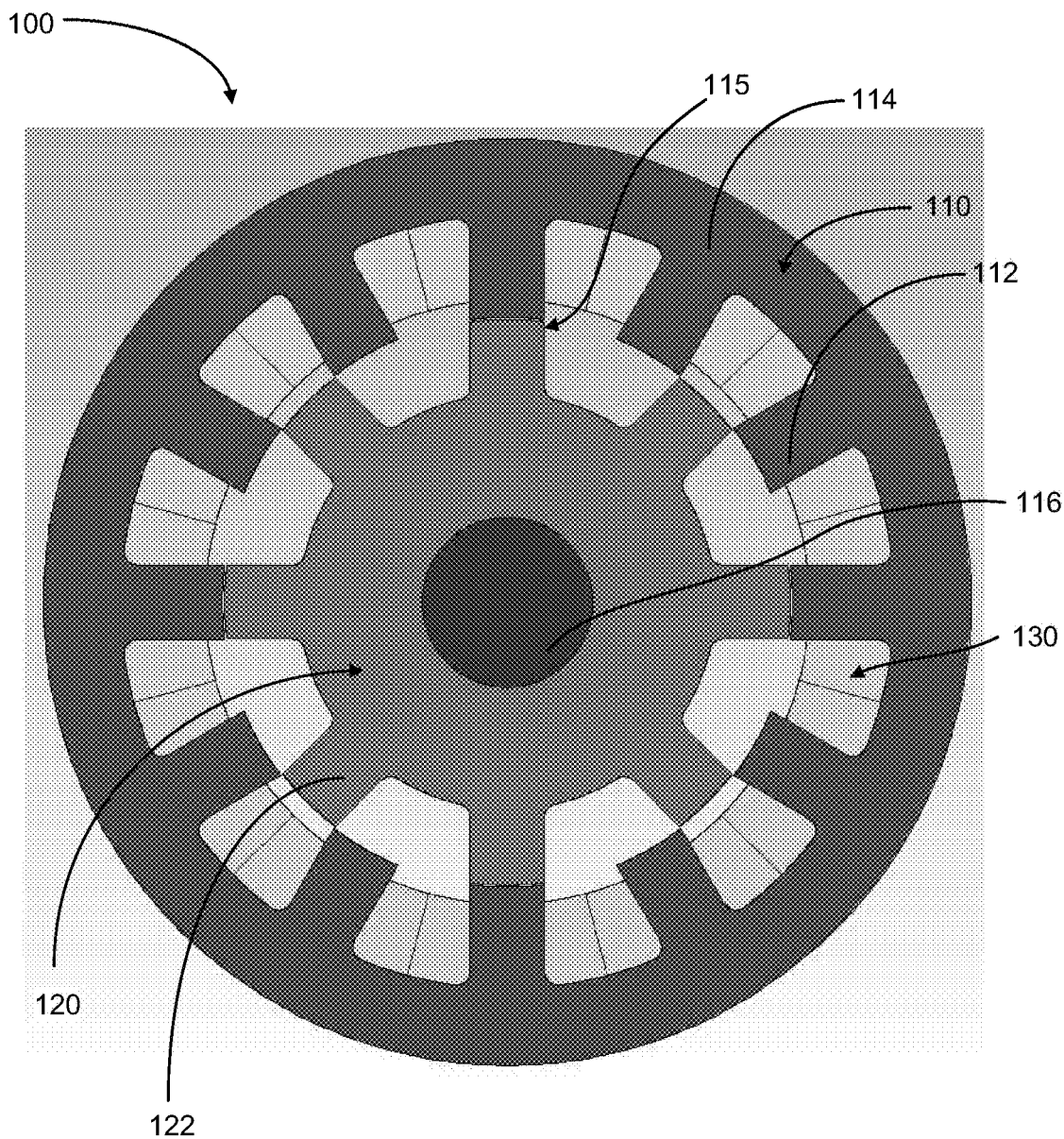
FIG. 1 shows a cross sectional view of an example switched reluctance machine.

Unless otherwise indicated, the definitions and embodiments described in this and other sections are intended to be applicable to all embodiments and aspects of the present application herein described for which they are suitable as would be understood by a person skilled in the art.

In understanding the scope of the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

As used in this application, the singular forms "a", "an" and "the" include plural references unless the content clearly dictates otherwise.

In embodiments comprising an "additional" or "second" component, the second component as used herein is physically different from the other components or first component. A "third" component is different from the other, first, and second components, and further enumerated or "additional" components are similarly different.

The term "and/or" as used herein means that the listed items are present, or used, individually or in combination. In effect, this term means that "at least one of" or "one or more" of the listed items is used or present.

In general, the embodiments described herein relate to electric machines and in particular reluctance machines. In embodiments described herein, a reluctance motor includes salient poles on both the stator and rotor. Each stator pole can have concentrated coil windings wound around them (i.e. there are concentrated coil windings around each stator pole). The windings for the plurality of stator poles can be arranged to allow the reluctance motor to be driven using an alternating current waveform.

In embodiments described herein, the coil windings can be arranged so that when excited with alternating current, the number of magnetic half-poles is equal to the number of teeth on the rotor. The number of rotor teeth may be selected based on the desired operating conditions and performance requirements for a given implementation. Correspondingly, the number of stator teeth can be determined based on the number of rotor teeth and the number of phases to be used.

In embodiments described herein, the reluctance motor can be driven using alternating current across all three phases. Accordingly, the reluctance motor may use a conventional voltage source inverter. This may facilitate construction of the motor using industry standard power electronics that are applicable to other AC machine technologies rather than requiring the asymmetric bridge required by typical switched reluctance machines. At the same time, the salient pole structure may facilitate low cost manufacturing and ease of construction.

Reluctance type electric machines generate torque by changing reluctance in the magnetic circuit. There are two main types of reluctance machines: switched reluctance machines (SRMs) and synchronous reluctance machines (SyncRMs).

FIG. 1 shows a cross-sectional view of an example switched reluctance machine 100. The switched reluctance machine 100 includes a stator 110 and a rotor 120. The rotor 120 is disposed concentrically with the stator 110, in this case the rotor 120 is positioned radially inward of the stator 110.

Both the stator 110 and rotor 120 include a plurality of protrusions that define salient teeth or salient poles. The stator 110 has a stator core 114 and a plurality of stator teeth 112, in this case twelve stator teeth 112. The rotor 120 includes a plurality of rotor teeth 122, in this case eight rotor teeth 122. The stator teeth 112 protrude radially from a ring portion of the stator core 114 towards the rotor 120. Similar, the rotor teeth 122 protrude radially from a ring portion of the rotor core towards the stator 110.

An air gap 115 is also provided between the rotor poles 122 and the stator poles 112. Machine 100 also includes a bore 116 for a shaft. Switched reluctance machine 100 is an example of a twelve stator pole and eight rotor pole switched reluctance machine with an example of conventional core winding design. That is, the stator 110 has coil windings 130 around each stator tooth 112.

SRMs can be designed with varying numbers of stator and rotor poles, and varying number of phases. In general, SRMs have no excitation sources on the rotor 120.

The coils 130 are wound around each stator tooth 112 and then connected together to create the phase windings for each phase. The salient pole configuration both on the rotor and the stator provides a relatively simple manufacturing process and robust operation for SRM. Concentrated coil windings of the SRM may provide smaller end turns and a simpler manufacturing process.

Figure 2:
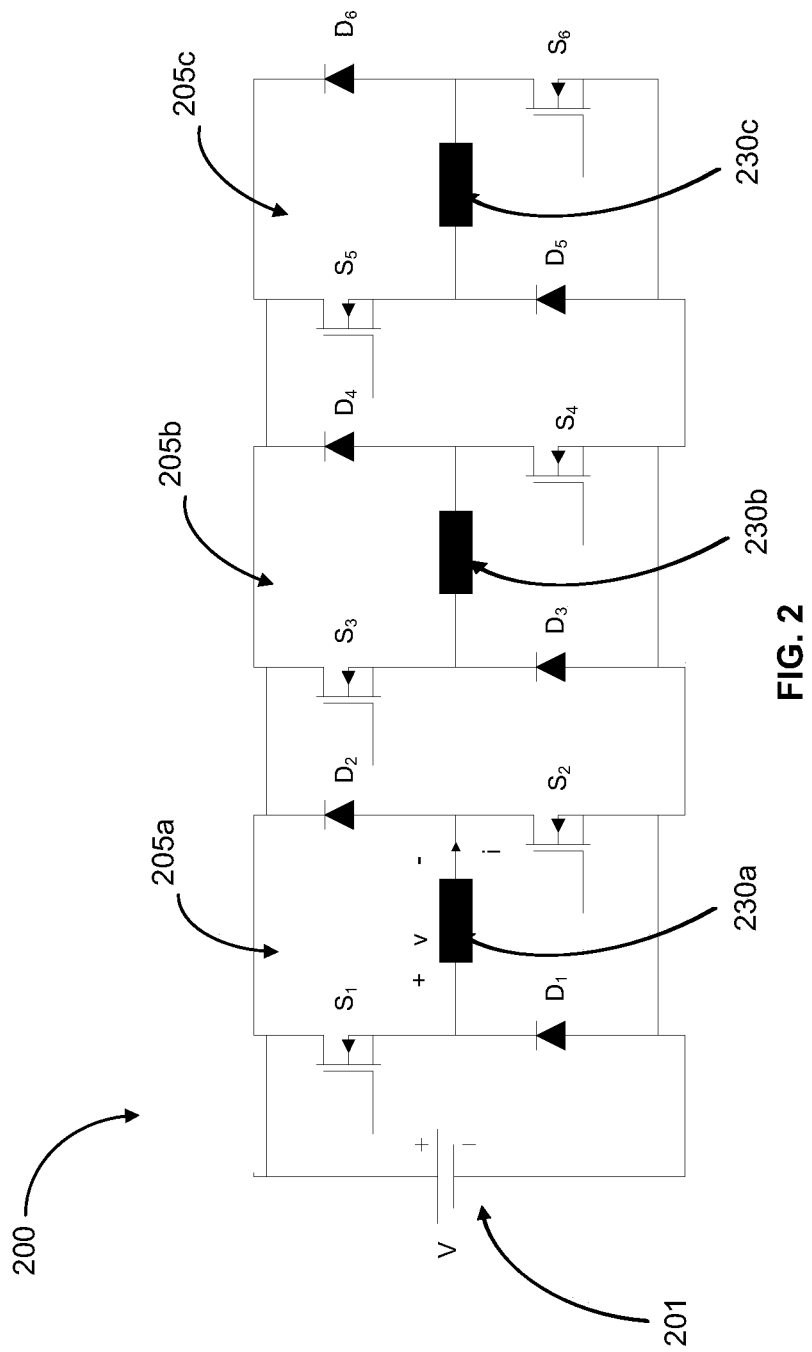
FIG. 2 shows a circuit diagram of an example three-phase asymmetric bridge converter.

In an SRM such as SRM 100, the windings 130 in different phases are energized as a function of the position of rotor 120. Typically, the current in each phase is controlled by an asymmetric bridge converter. FIG. 2 shows an example circuit diagram of a three-phase asymmetric bridge converter 200 for a three-phase SRM such as SRM 100. In the asymmetric bridge converter 200, a power source (voltage source 201) is coupled to a plurality of phase coils 230a-230c by switching sections 205a-205c. The individual phase coils 230a-230c may be energized and de-energized so that only one phase is active (i.e. receiving current) at a given time.

In the SRM 100, the phase windings 130 for different phases are electrically isolated from each other. As a result, conventional inverters cannot be used to supply power to the phase coils 130. The asymmetric bridge converter 200 is used to electrically isolate the phase coils 230a, 230b and 230c. However, this asymmetric bridge structure requires specialized semiconductor modules. The use of an asymmetric bridge may reduce the power density and increase the cost of the converter used for the reluctance machine. Additionally, the asymmetric bridge requires additional connector cables extending out from the motor 100, which can further increase the complexity of the implementation and control of the motor drive system as well as the cost.

Figure 3:
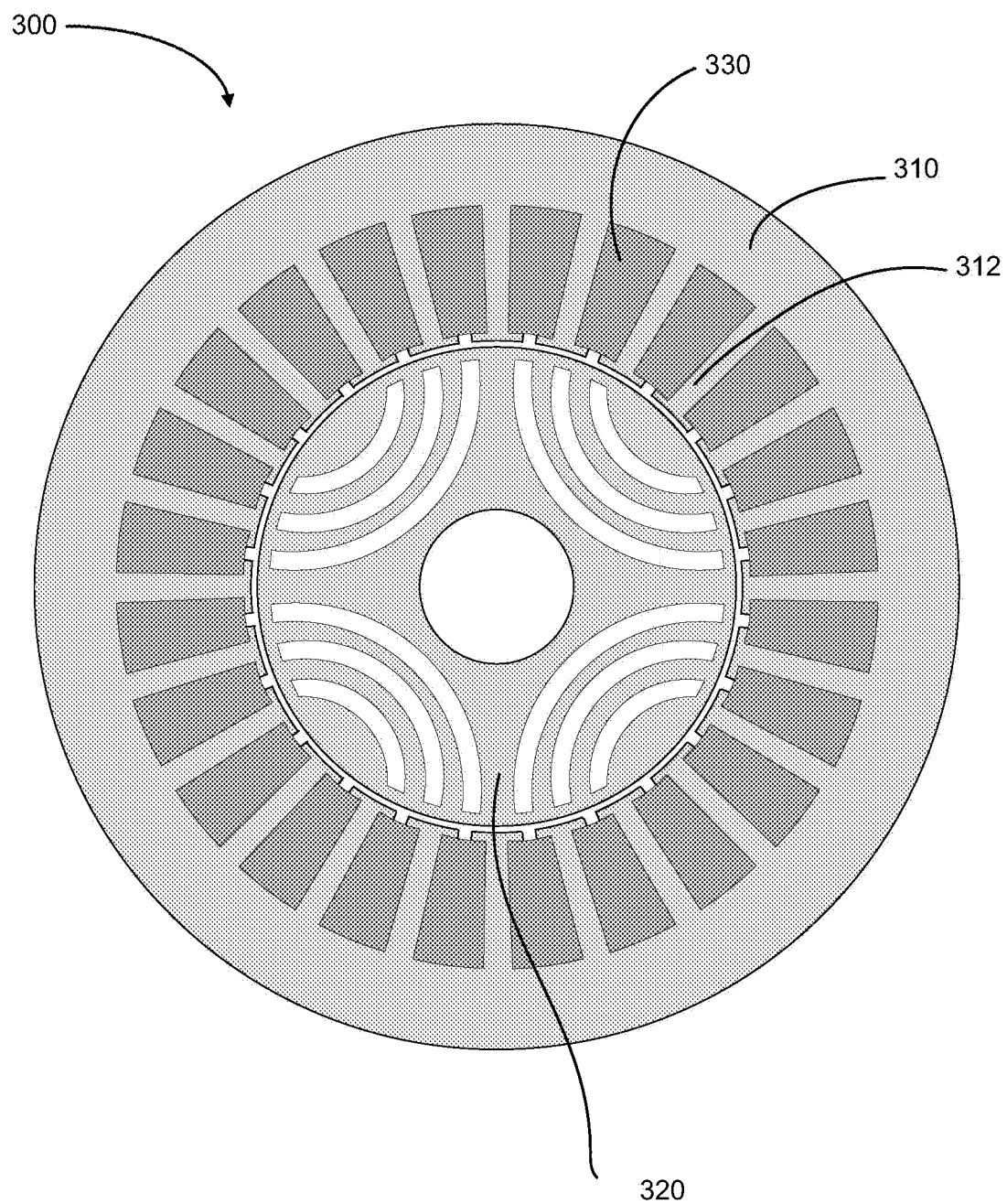
FIG. 3 shows a cross sectional view of an example synchronous reluctance machine.

Similar to SRMs, the torque production in Synchronous Reluctance Machines (SyncRM) is based on varying the magnetic reluctance. FIG. 3 shows a cross sectional view of an example synchronous reluctance motor 300. The motor 300 includes a stator 310 and a rotor 320 that is concentrically disposed with the stator 310. The stator includes a plurality of salient stator teeth 312. However, unlike the switched reluctance motor 100, the rotor 320 does not have any salient rotor teeth.

The rotor 320 of a SyncRM 300 can be more complicated to manufacture as compared to the rotor 120. A simpler manufacturing process can be expected for SRM 100 due to the salient pole structure. In SyncRM 300, the production of the rotor laminations may require tighter manufacturing tolerances. These factors can increase the complexity and cost of manufacturing a SyncRM 300.

SyncRMs can also be designed with varying numbers of stator and rotor poles, and varying number of phases. In general, SyncRMs also have no excitation sources on the rotor 320.

A plurality of coil windings 330 are wound around the stator teeth 312. The coils windings 330 of a SyncRM are wound around the stator teeth 312 with a distributed winding pattern (see FIG. 4). In the distributed winding structure, the coils 330 are spatially distributed around the circumference of the stator 310. These distributed windings can have larger end turns and they can be more complicated to manufacture. However, unlike SRM 100, conventional inverters can be used to supply power to energize the coil windings 330.

Figure 4:
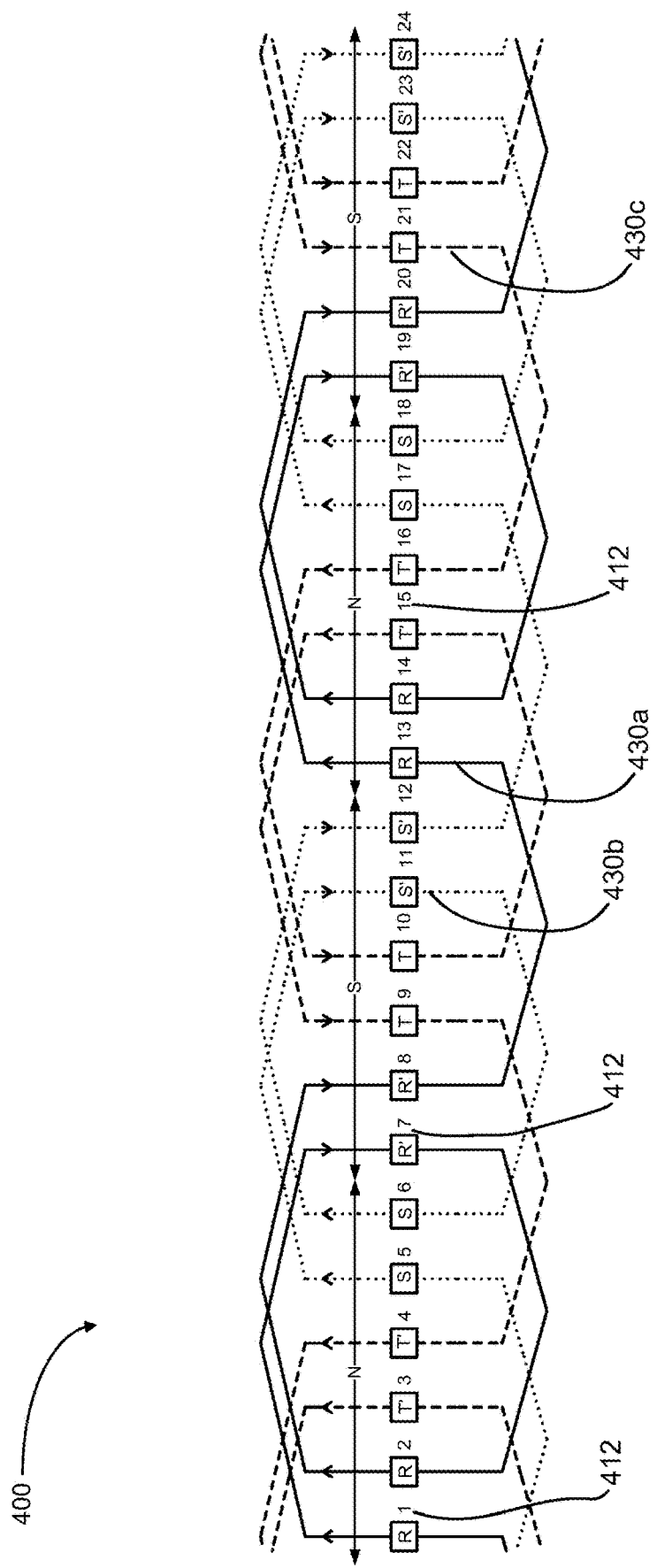
FIG. 4 illustrates an example schematic of the winding configuration of a synchronous reluctance machine.

Referring now to FIG. 4, shown therein is an example schematic 400 of the distributed winding configuration of a synchronous reluctance machine such as motor 300. As shown in schematic 400, the coils 430a-430c do not include concentrated windings around any individual stator tooth 412. The coils 430 are distributed around the circumference of the stator and do not have any coils that have a complete wind around a given stator tooth. Rather, the coils 430 wind around half a stator tooth 412 before extending to another stator tooth. This can increase the length of the end turns of the coils 430 as compared to the concentrated windings used in switched reluctance machines. This can result in increased phase resistance as well as increased complexity of stator manufacturing.

Figure 5:
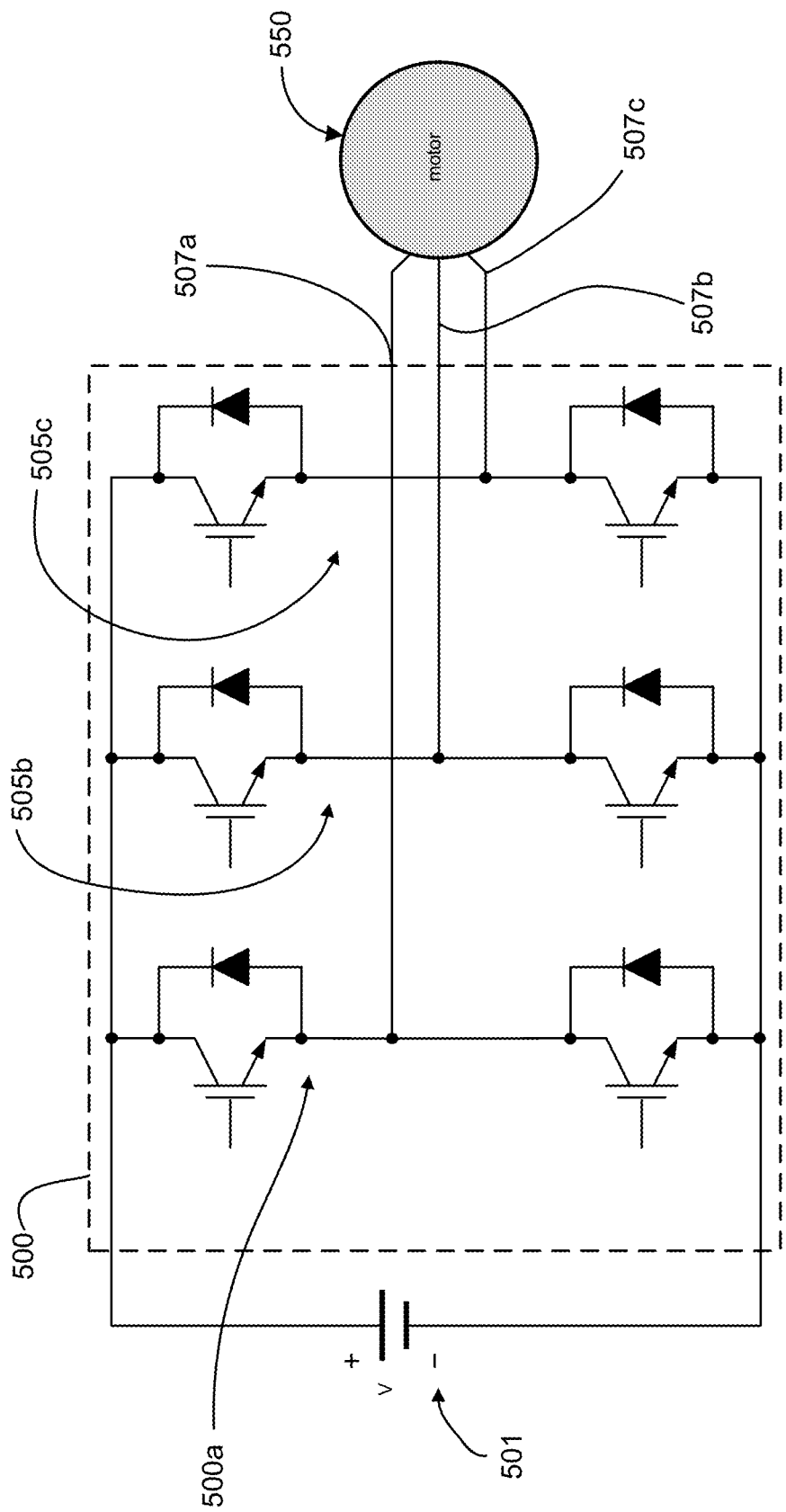
FIG. 5 shows a circuit diagram of an example conventional inverter.

However, unlike SRM 100, SyncRM 300 can be driven using alternating current and controlled using a conventional inverter. FIG. 5 shows a schematic circuit diagram of a circuit that may be used with the SyncRM 300. The circuit includes an inverter 500, which is used to electrically couple a power source (voltage source 501) to the motor 550.

The inverter 500 is a multi-phase inverter, which in this example is a three-phase inverter. The number of phases of the inverter 500 may vary based on the number of phases used in motor 550. The motor 550 can include electrical coils with a plurality of separate phase coils 507a-507c. Each phase coil 507 can be coupled to a separate phase section 505a-505c of the three-phase inverter 500. Thus, each phase coil 507 can be coupled to the power source 501 via the inverter 500.

The inverter 500 may operate to convert direct current (DC) from the voltage source 501 to alternating current (AC) to be provided to the phase coils 507a-507c. Each phase coil 507a-507c may be simultaneously active (i.e. receiving alternating current) while the motor 550 is operational.

In comparison with the asymmetric bridge 200, described above, it can be seen that the inverter 500 (and each phase section 505a-505c) requires fewer components than the asymmetric bridge 200. All the switches in the inverter 500 can be included in a single module and off-the-shelf components can be used flexibly. This is not the case for asymmetric bridge converters, such as converter 200, in general.

Accordingly, off-the-shelf semiconductor modules can be used to drive a SyncRM such as motor 300. Additionally, fewer cables may be required between the motor 550 and the inverter 500 as compared to the asymmetric bridge converter 200 used with SRMs. This may reduce the cost of the driver and also the complexity of the motor drive system.

Figure 6:
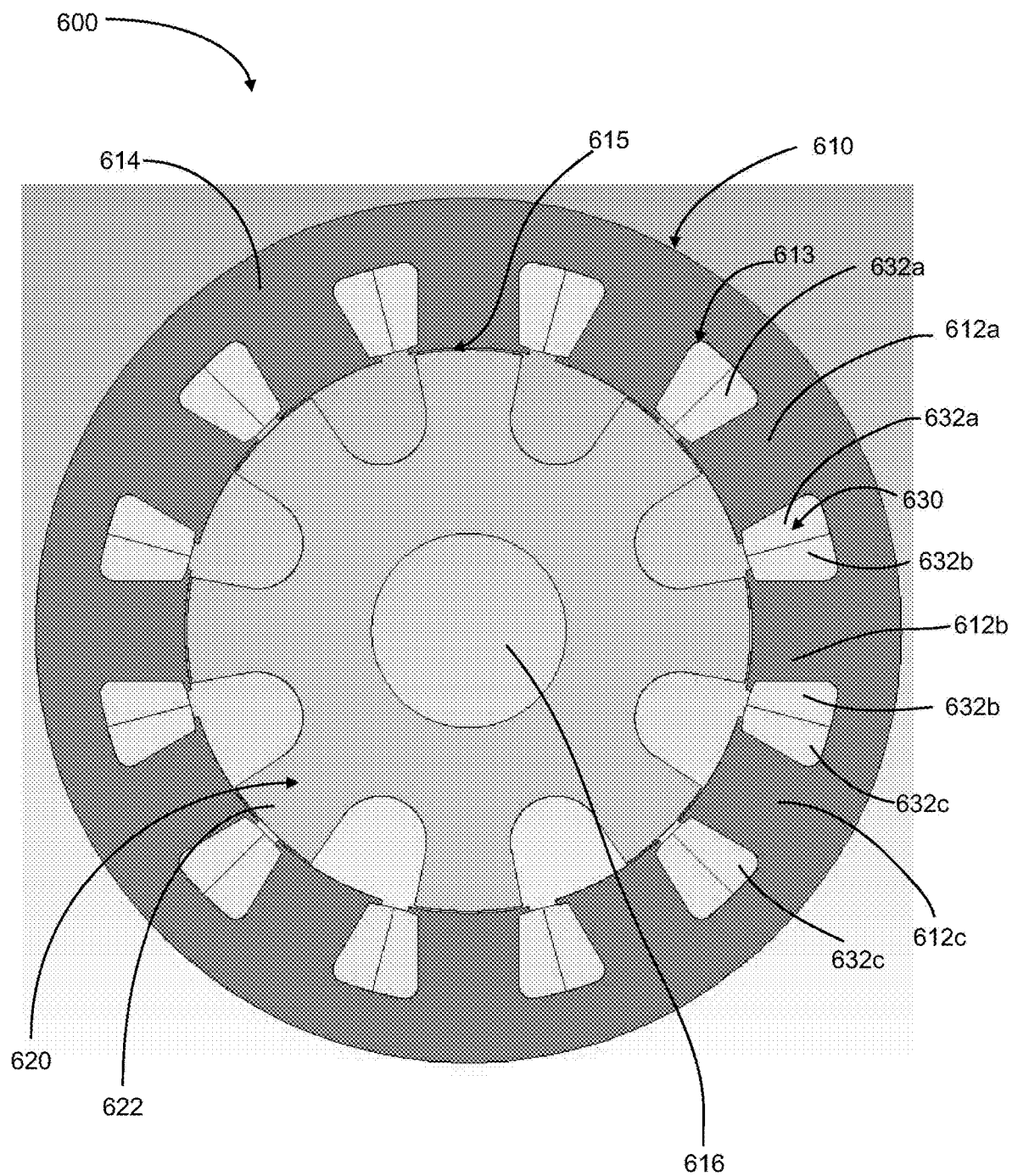
FIG. 6 shows a cross sectional view of an example reluctance motor in accordance with an embodiment.

Referring to FIG. 6, shown therein is a cross-sectional view of an example reluctance machine 600 in accordance with an embodiment. The reluctance machine 600 shown in FIG. 6 has a similar structure to reluctance machine 100. The primary difference between reluctance machine 600 and reluctance machine 100 relates to the connection of the electrical coils. In reluctance machine 600, the coils 630 are connected to enable excitation using alternating current and a 3-phase bridge inverter. This ultimately results in differences in dimensions of the stator and rotor teeth between reluctance machine 100 and reluctance machine 600, even though the number of rotor and stator teeth remains the same.

Reluctance machine 600 includes a stator 610 disposed concentrically with a rotor 620. Reluctance machine 600 is an example of a reluctance machine having both salient stator teeth 612 and salient rotor teeth 622 that can be driven using alternating current. In the example shown, the reluctance motor includes eight rotor teeth 622 and twelve stator teeth 622. As will be appreciated, the structure of reluctance machine 600 is merely exemplary, and various alternative reluctance motor configurations can be provided with different numbers of rotor teeth, stator teeth and phases.

Stator 610 includes a stator core 614 and a plurality of salient stator teeth or poles 612. The stator teeth 612 protrude from the stator core 614 and extend radially from the stator core 614. In the example of reluctance machine 600, the stator teeth 612 extend radially inward from the stator core 614. In alternative configurations (e.g. where a rotor is disposed outward of the stator) the stator teeth 612 may extend radially outward. The space between stator teeth 612 that are adjacent one another around the circumference of the stator 610 may be referred to as a slot 613.

The rotor 620 is concentrically disposed with the stator 610. In the example of reluctance machine 600, the rotor 620 is disposed inward of the stator 610. In alternative configurations, the rotor 620 may be disposed outward of the stator 610.

The rotor 620 includes a plurality of salient rotor teeth or poles 622. The rotor teeth 622 protrude from the rotor 620 and extend radially from the rotor 620 towards the stator teeth 612. In the example of reluctance machine 600, the rotor teeth 622 extend radially outward from the rotor 620. In alternative configurations (e.g. where the rotor is disposed outward of the stator) the rotor teeth 622 may extend radially inward. In general, however, the rotor teeth 622 and stator teeth 612 extend generally towards one another.

The reluctance machine 600 also includes a plurality of electrical coils 630 wound about the stator teeth 612. The plurality of electrical coils 630 can include a plurality of separate phase coils. The plurality of phase coils can define a plurality of phases of the reluctance machine 600. As with machines 100 and 300 described above, the reluctance machine 600 may not have any excitation source provided on the rotor 620.

In the example of reluctance machine 600, three separate phase coils 632a, 632b and 632c are shown. Each phase coil 632a-632c includes a phase winding section that is wound about (i.e. around) a corresponding stator tooth 612a-612c. The electrical coils 630 in reluctance machine 600 are arranged with concentrated windings around the stator teeth 612.

An air gap 615 is also provided between the stator poles 612 and the rotor poles 622. The machine 600 also includes a shaft bore 616. The rotor 620 can be mounted on a shaft passing through the bore 616. Electrical current can be provided to the coil windings 630 to induce an electromagnetic field. The coil windings 630 can thereby excite the stator poles 612 by inducing magnetic flux in the stator poles 612. The rotor 620 can be rotatable to align the rotor poles 622 with the stator poles 612 as a result of the induced magnetic flux.

The flux can penetrate the air gap 615 between the stator poles 612 and the rotor poles 622 and then go into the rotor 620. The flux between the excited stator poles 612 and the corresponding rotor poles 622 tends to align the rotor poles 622 with the stator poles 612 so that the rotor 620 rotates. This can provide a motoring operation in the switched reluctance machine 600.

In reluctance machine 600, the number of stator teeth 612 and the arrangement of the phase coils 632a-632c are defined so that, when the multiple-phase windings are excited with alternating current, the number of half-cycles in the fundamental waveform of the airgap flux density is equal to the number of rotor teeth. In other words, the plurality of electrical coils 630 are arranged to define a current linkage waveform of the reluctance motor 600 that includes a number of half-cycles equal to the number of salient rotor teeth 622.

In reluctance machine 600, the phase coils 632a-632c can be driven with alternating currents using an inverter, such as inverter 500 described herein above. The alternating currents need not be limited to sinusoidal waveforms, but can also include other alternating current waveforms. As explained above, the phase coils 632a-632c can be coupled to a power source via the inverter 500. Each phase coil 632a-632c may have a phase coil input and a phase coil output that are coupled to the power source by the inverter.

Figure 7A:
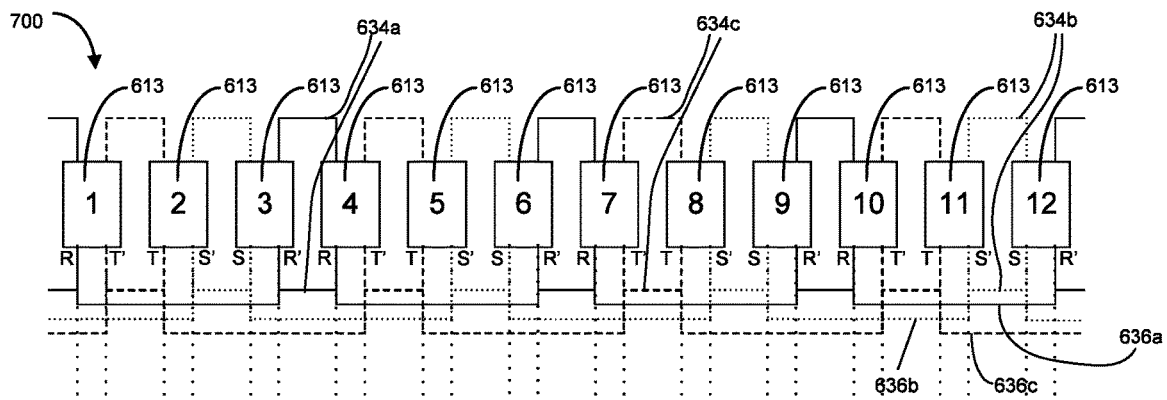
FIG. 7A illustrates an example schematic of a winding configuration for the reluctance motor of FIG. 6 in accordance with an embodiment.

Each phase coil 632a-632c can also include a plurality of phase winding sections 634 and a plurality of linking sections 636 (shown in FIG. 7A). Each phase winding section 634 can be wound about a different one of the stator teeth 612. The phase winding sections 634 can be joined in a sequence by the plurality of linking sections 636 to form a current path between the phase coil input and the phase coil output. Accordingly, each phase coil 632a-632c can form a complete circuit through the power source when coupled thereto by the inverter 500.

Figure 15:
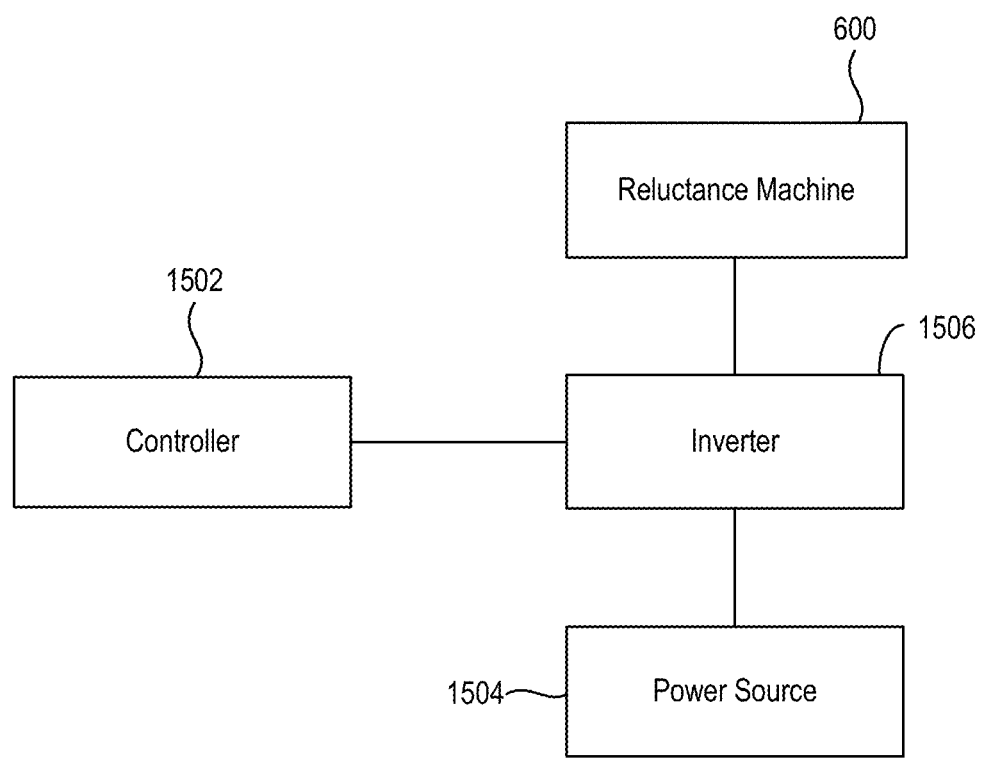
FIG. 15 shows a block diagram of an example reluctance machine in accordance with an embodiment.

As shown in the example of FIG. 15, a controller 1502 or processor may also be included with reluctance machine 600. The controller 1502 may operate to drive the reluctance machine 600, e.g. by controlling the alternating current provided to the phase coils 632a-632c by the power source 1504 (e.g. power source 501) and inverter 1506 (e.g. inverter 500). The controller 1502 may be any suitable processor, controller or digital signal processor that can provide sufficient processing power depending on the configuration, purposes and requirements of the reluctance machine as is known by those skilled in the art. Similarly, the processor may be coupled to volatile and non-volatile memory required for the processes performed by the reluctance machine 600.

For example, the processor may be a high performance general processor. In some embodiments, the processor may include more than one processor with each processor being configured to perform different dedicated tasks. In some embodiments, the processor may be provided using specialized hardware such as an FPGA or application specific circuitry. In some embodiments, the processor may be provided by a desktop computer, a laptop computer, a tablet, a handheld device such as a smartphone and the like.

Referring now to FIG. 7A, shown therein is a schematic drawing of a concentrated winding configuration 700 for the plurality of electrical coils 630 of reluctance machine 600. As shown in FIG. 7A, the reluctance machine 600 includes twelve slots 613 between adjacent salient stator teeth 612. The winding configuration 700 shown in FIG. 7A is an example of a winding configuration that enables an alternating-current driven salient-teeth reluctance motor with concentrated windings having eight rotor teeth and three phases. That is, the winding configuration 700 define a current linkage waveform of the reluctance motor 600 that includes a number of half-cycles equal to the number of salient rotor teeth 622 (see e.g. FIG. 7B discussed below).

As shown in FIG. 7A, a phase winding section 634 is wound around each stator tooth. Each phase winding section 634a-634c includes a portion on adjacent stator teeth slots 613. Each slot 613 has two coil sides. By winding a single phase coil windings around the adjacent coil sides of the neighboring slots, the windings are concentrated.

In the concentrated winding configurations used in embodiments described herein, each phase winding section 634 will have at least one full turn (or wind) around a given stator tooth 612. The number of winds/turns around the stator teeth 612 may vary depending on the application. In many cases, each phase winding section 634 will have a plurality of turns around a given stator tooth 612.

The winding configuration 700 includes phase winding sections 634a-634c and phase linking sections 636a-636c corresponding to three separate phases. Thus, the reluctance machine 600 can operate with three separate phases. Each phase can be coupled to a power source using an inverter as described herein above.

The phase winding sections 634a-634c corresponding to a given phase are connected in sequence by corresponding linking sections 636a-636c. The phase winding sections 634a-634c and linking sections 636a-636c can form a current path between a phase coil input and a phase coil output that are coupled to the power source.

As a skilled reader will appreciate, the winding configuration 700 shown in FIG. 7A is an example of a suitable winding configuration for a reluctance machine having eight rotor teeth and twelve stator teeth that operates with three phases. Various alternative winding configurations may be used in embodiments described herein to define the number of half-cycles in the fundamental waveform of the airgap flux density to be equal to the number of rotor teeth.

Figure 8:
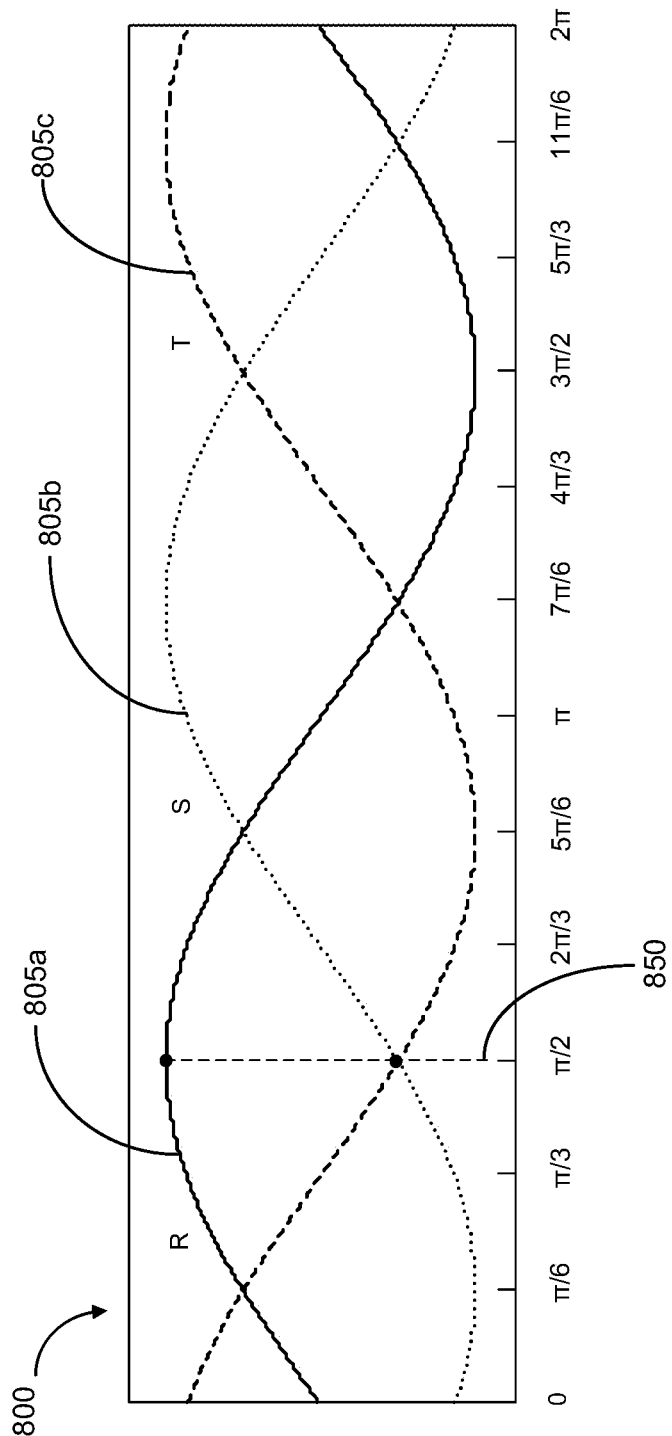
FIG. 8 illustrates an example plot of phase currents for a three-phase reluctance motor in accordance with an embodiment.

FIG. 8 shows an example plot 800 of phase currents for a three-phase salient-teeth reluctance motor with 12 stator poles and 8 rotor poles such as reluctance machine 600. In the example shown in plot 800, the phase currents 805a, 805b and 805c are sinusoidal. However, depending on the requirements of a given implementation the phase current may have a different shape provided that the waveform is alternating.

Figure 7B:
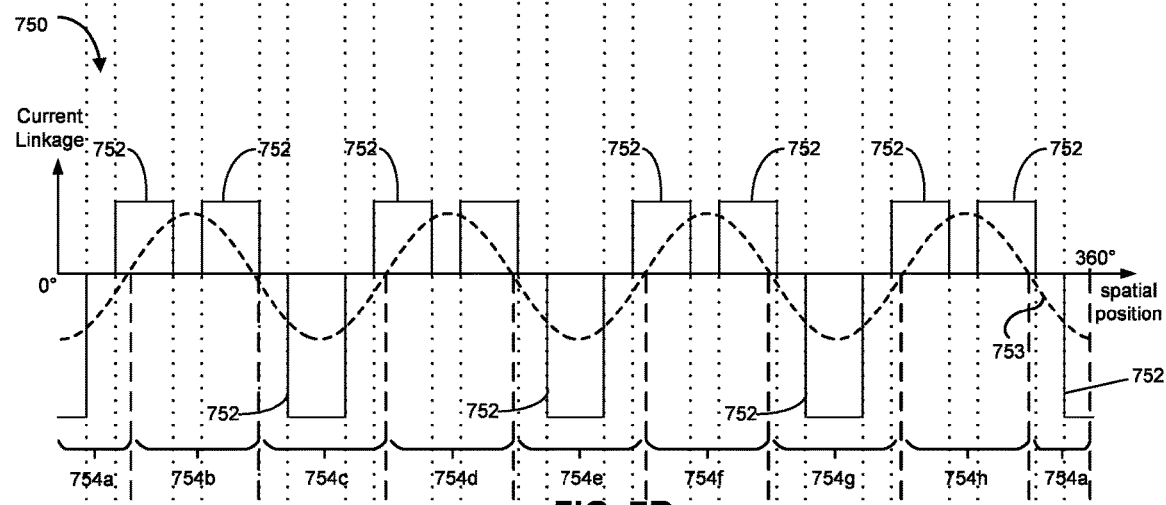
FIG. 7B illustrates an example plot of the current linkage waveform for the winding configuration of FIG. 7A in accordance with an embodiment.

FIG. 7B illustrates an example plot 750 of the current linkage for a three-phase salient-teeth reluctance motor with 12 stator poles and 8 rotor poles using the winding configuration shown in FIG. 7A. The plot 750 illustrates the current linkage waveform at the time 850 indicated in phase current plot 800. The dashed line 753 shown in FIG. 7B illustrates how the pulses 752 correspond to a sinusoidal-type distribution alternating between positive and negative. A winding configuration that results in pulses 752 with this type of alternating variation can enable the rotation of the rotor.

When the winding configuration 700 is excited using the alternating current waveform 805a- 805c, at time t=TT/2 (in electrical degrees in radians), the current linkage distribution 750 appears in the phase windings arranged around the plurality of stator teeth. At different time instants along the plot 800 (i.e. as current is provided to the phase coils 632a-632c), the same current linkage distribution shown in plot 750 shifts to a different position in the phase windings. This can create a rotating field inducing rotation of the rotor 620.

As shown in plot 750, the current-linkage distribution can include positive and negative pulses 752 that are distributed around the phase windings as a function of the spatial position of the phase windings around the circumference of the stator (see e.g., 0° to 360° along the X-axis of plot 750). The number and spatial position of pulses 752 in the current-linkage waveform 750 results in a sinusoidal-type distribution of fundamental harmonic (i.e., expressed by the dashed line 753) having a number of half-cycles (e.g., 754a-754h) being equal to the number of rotor teeth 622 (which in this case is eight).

Figure 7C:
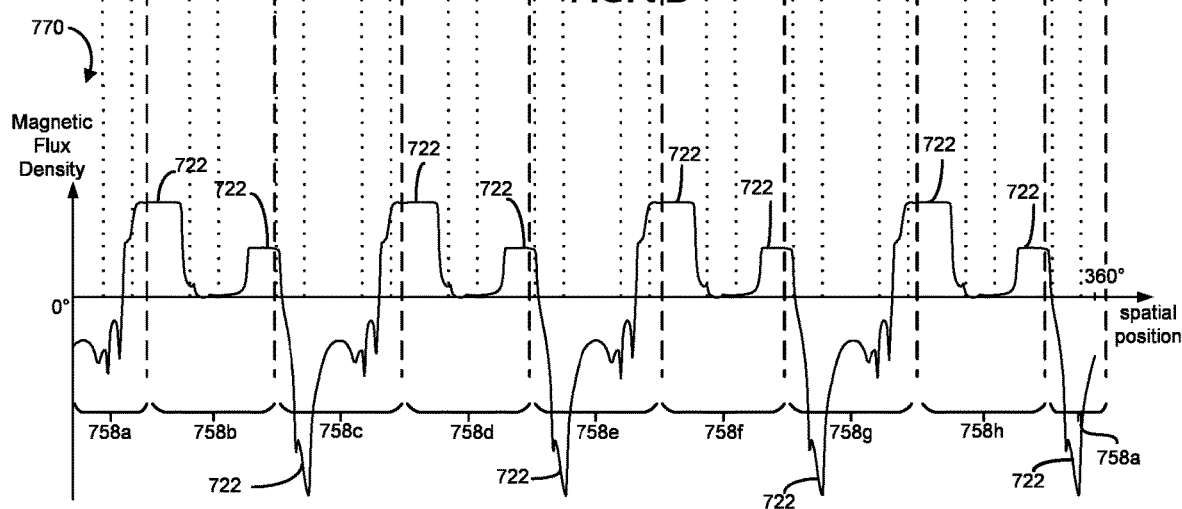
FIG. 7C illustrates an example plot of the magnetic flux density waveform for the winding configuration of FIG. 7A in accordance with an embodiment.

FIG. 7C shows a plot 770 of the magnetic flux density waveform that resulted from finite element simulations of the alternating-current driven salient-teeth reluctance motor described above with references to FIGS. 6 and 7A. In finite element simulation, the inherent nonlinear characteristics of the magnetic circuit are taken into account; therefore, the flux density waveform 770 is different from the rectangular current-linkage waveform 750 in FIG. 7(b). Plot 770 shows the pulses 722 in the magnetic flux density waveform as a function of spatial position around the circumference of the air gap in between the rotor and the stator (see e.g., 0° to 360° along the X-axis of plot 770). It can be noticed that the magnetic flux density waveform 770 also has a sinusoidal-type distribution of fundamental harmonic, which results from the number and the spatial position of the pulses 722, that has a number of half-cycles 758a-758h that is again equal to the number of rotor teeth (i.e., eight).

It should be noted that, due to the inherent nonlinear characteristics of the magnetic circuit defined by reluctance machines configured in accordance with the embodiments described herein, the dimensions, parameters, material properties, and rotor and stator teeth configuration can be defined based on the particular implementation requirements.

Various combinations of numbers of rotor teeth, numbers of stator teeth and number of phases can be configured to provide a flux density waveform having a number of half-cycles equal to the number of rotor teeth. The particular combination selected may be determined based on the particular implementation requires so long as the number of pulses in the current-linkage waveform results in the number of half-cycles in the fundamental harmonic of the current-linkage waveform being equal to the number of rotor teeth.

FIGS. 9-14 show some examples of winding configurations reluctance machines operating with three-phases and having different numbers of stator and rotor teeth. FIGS. 9-14 illustrates some example winding configurations suitable for reluctance machines operating in three phases with 9/10, 9/14, 12/10, 12/14, 12/22, 15/14, 15/16, 18/10, 18/16, 21/20, and 24/10 stator teeth/rotor teeth topologies, although other suitable winding configurations may also be used.

Figures 9A, 9B:
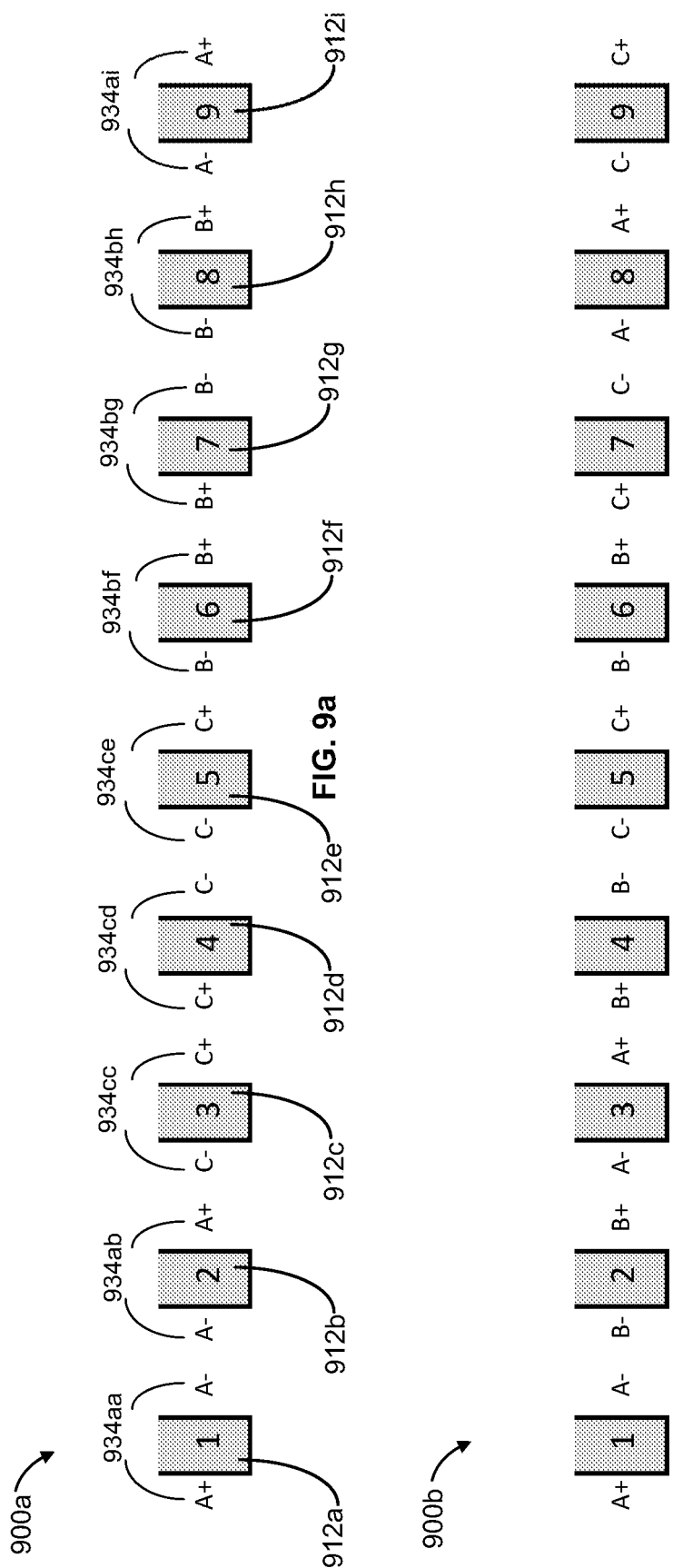
FIG. 9A illustrates an example schematic of a winding configuration for a reluctance motor with nine stator teeth and ten rotor teeth in accordance with an embodiment.
FIG. 9B illustrates an example schematic of a winding configuration for a reluctance motor with nine stator teeth and fourteen rotor teeth in accordance with an embodiment.

FIGS. 9A and 9B illustrate examples of phase coil winding configurations for various three-phase reluctance machines having nine (9) salient stator teeth. The phase coil winding configurations shown in FIGS. 9A and 9B define a current linkage waveform having a number of pulses that results in the number of half-poles/half-cycles corresponding to the number of rotor teeth in each example reluctance machine configuration.

Various alternative winding configurations may be used in other embodiments of three-phase various reluctance machines having nine (9) salient stator teeth so long as the current linkage waveform that results when the coils are excited by an alternating current includes the number of half-cycles corresponding to the number of rotor teeth.

FIG. 9A illustrates an example phase coil winding configuration for a reluctance motor having nine salient stator teeth and ten salient rotor teeth in accordance with an embodiment. Each stator tooth has a corresponding phase winding section of one of the phase coils wound about that stator tooth. In the example of FIG. 9A, the three phase coils are wound around the plurality of salient stator teeth to define a current linkage waveform having ten half-cycles when the phase coils are energized.

As shown in FIG. 9A, the winding configuration 900a includes a plurality of phase winding sections 934 that are wound around a corresponding stator tooth 912a-912i. Each phase winding section 934 corresponds to a particular phase of the reluctance machine. The phase winding sections 934 for a given phase are also connected to one another by linking sections (not shown in FIG. 9A). The winding configuration 900a corresponds to a reluctance machine operating with three-phases and accordingly includes phase windings sections 934a, 934b, and 934c corresponding to the different phases.

In some examples, as in winding configuration 900a, phase winding sections 934 for the same phase may be adjacent to one another. For example, phase winding sections 934aa and 934ab (corresponding to a first phase a) are wound around adjacent stator teeth 912a and 912b, and therefore are adjacent to one another. Similarly, phase winding sections 934cc, 934cd, and 934ce (corresponding to a second phase c) are adjacent one another and wound around stators 912c-912e in sequence from 934cc to 934ce.

In some cases, adjacent phase winding sections that correspond to the same phase (such as phase winding sections 934aa and 934ab) are wound around their corresponding stator teeth 912 so that current flows in opposite directions. For example, phase winding section 934aa is wound around stator tooth 912a to define a first direction of current flow. Phase winding section 934ab is wound around stator tooth 912b to define a second direction of current flow. As shown in FIG. 9A, the first direction of current flow and the second direction of current flow are in opposite directions.

FIG. 9B illustrates an example phase coil winding configuration for a reluctance motor having nine salient stator teeth and fourteen salient rotor teeth in accordance with an embodiment. Each stator tooth has a corresponding phase winding section of one of the phase coils wound about that stator tooth. In the example of FIG. 9b, the phase coils are wound around the plurality of salient stator teeth to define a current linkage waveform having fourteen half-cycles when the phase coils are energized.

Figure 10A:
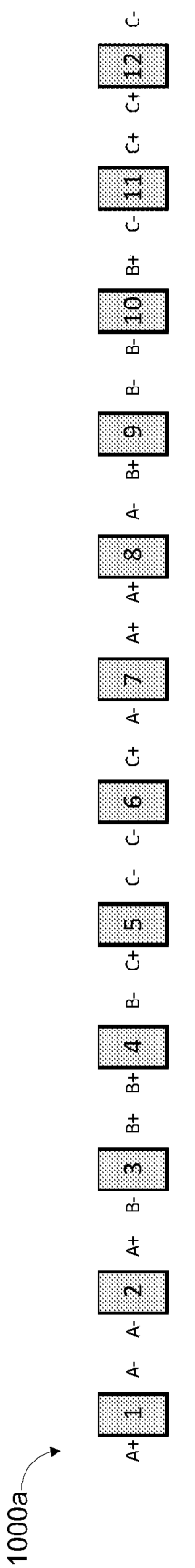
FIG. 10A illustrates an example schematic of a winding configuration for a reluctance motor with twelve stator teeth and ten rotor teeth in accordance with an embodiment.
Figure 10B:
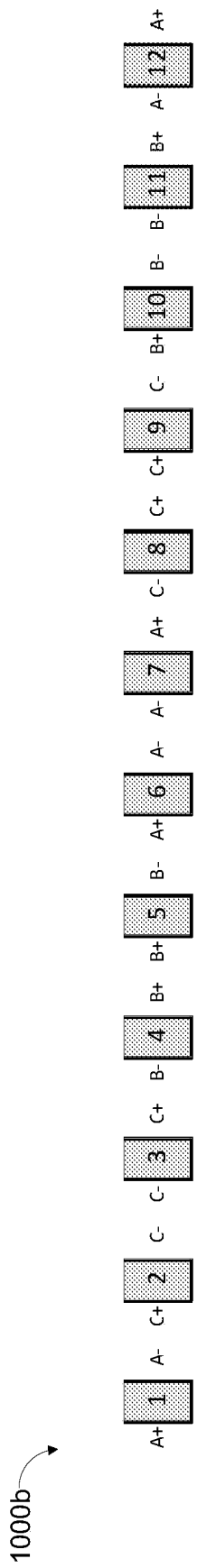
FIG. 10B illustrates an example schematic of a winding configuration for a reluctance motor with twelve stator teeth and fourteen rotor teeth in accordance with an embodiment.
Figure 10C:
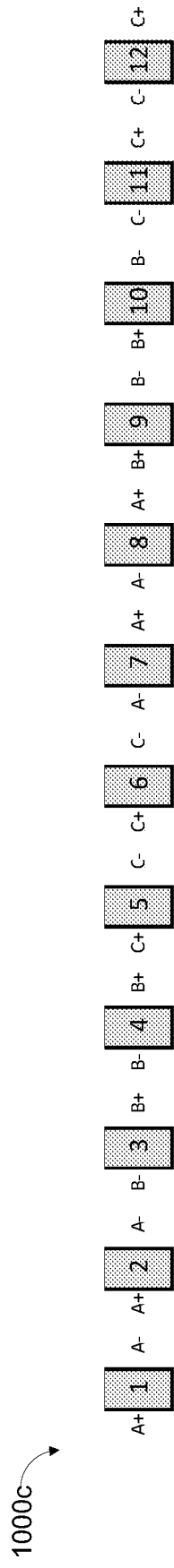
FIG. 10C illustrates an example schematic of a winding configuration for a reluctance motor with twelve stator teeth and twenty-two rotor teeth in accordance with an embodiment.

FIGS. 10A-10C illustrates examples of phase coil winding configurations for three-phase various reluctance machines having twelve (12) salient stator teeth. The phase coil winding configurations shown in FIGS. 10A-10C define a current linkage waveform having a number of pulses that results in the number of half-poles/half-cycles corresponding to the number of rotor teeth in each example reluctance machine configuration.

Various alternative winding configurations may be used in other embodiments of three-phase various reluctance machines having twelve (12) salient stator teeth so long as the current linkage waveform that results when the coils are excited by an alternating current includes the number of half-cycles corresponding to the number of rotor teeth.

FIG. 10A illustrates an example phase coil winding configuration for a reluctance motor having twelve salient stator teeth and ten salient rotor teeth in accordance with an embodiment. Each stator tooth has a corresponding phase winding section of one of the phase coils wound about that stator tooth. In the example of FIG. 10A, the three phase coils are wound around the plurality of salient stator teeth to define a current linkage waveform having ten half-cycles when the phase coils are energized.

FIG. 10B illustrates an example phase coil winding configuration for a reluctance motor having twelve salient stator teeth and fourteen salient rotor teeth in accordance with an embodiment. Each stator tooth has a corresponding phase winding section of one of the phase coils wound about that stator tooth. In the example of FIG. 10B, the three phase coils are wound around the plurality of salient stator teeth to define a current linkage waveform having fourteen half-cycles when the phase coils are energized.

FIG. 10C illustrates an example phase coil winding configuration for a reluctance motor having twelve salient stator teeth and twenty-two salient rotor teeth in accordance with an embodiment. Each stator tooth has a corresponding phase winding section of one of the phase coils wound about that stator tooth. In the example of FIG. 10C, the three phase coils are wound around the plurality of salient stator teeth to define a current linkage waveform having twenty-two half-cycles when the phase coils are energized.

Figure 11A:
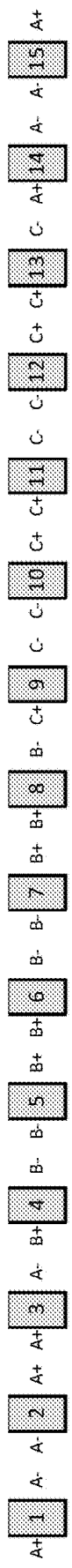
FIG. 11A illustrates an example schematic of a winding configuration for a reluctance motor with fifteen stator teeth and fourteen rotor teeth in accordance with an embodiment.
Figure 11B:
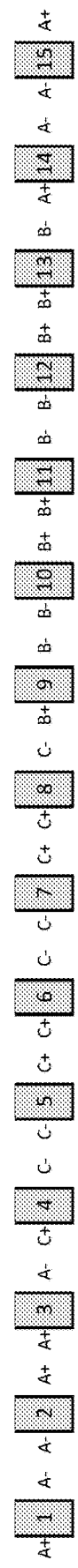
FIG. 11B illustrates an example schematic of a winding configuration for a reluctance motor with fifteen stator teeth and sixteen rotor teeth in accordance with an embodiment.

FIGS. 11A and 11B illustrate examples of phase coil winding configurations for various three-phase reluctance machines having fifteen (15) salient stator teeth. The phase coil winding configurations shown in FIGS. 11A and 11B define a current linkage waveform having a number of pulses that results in the number of half-poles/half-cycles corresponding to the number of rotor teeth in each example reluctance machine configuration.

Various alternative winding configurations may be used in other embodiments of three-phase various reluctance machines having fifteen (15) salient stator teeth so long as the current linkage waveform that results when the coils are excited by an alternating current includes the number of half-cycles corresponding to the number of rotor teeth.

FIG. 11A illustrates an example phase coil winding configuration for a reluctance motor having fifteen salient stator teeth and fourteen salient rotor teeth in accordance with an embodiment. Each stator tooth has a corresponding phase winding section of one of the phase coils wound about that stator tooth. In the example of FIG. 11A, the three phase coils are wound around the plurality of salient stator teeth to define a current linkage waveform having fourteen half-cycles when the phase coils are energized.

FIG. 11B illustrates an example phase coil winding configuration for a reluctance motor having fifteen salient stator teeth and sixteen salient rotor teeth in accordance with an embodiment. Each stator tooth has a corresponding phase winding section of one of the phase coils wound about that stator tooth. In the example of FIG. 11b, the three phase coils are wound around the plurality of salient stator teeth to define a current linkage waveform having sixteen half-cycles when the phase coils are energized.

Figure 12A:
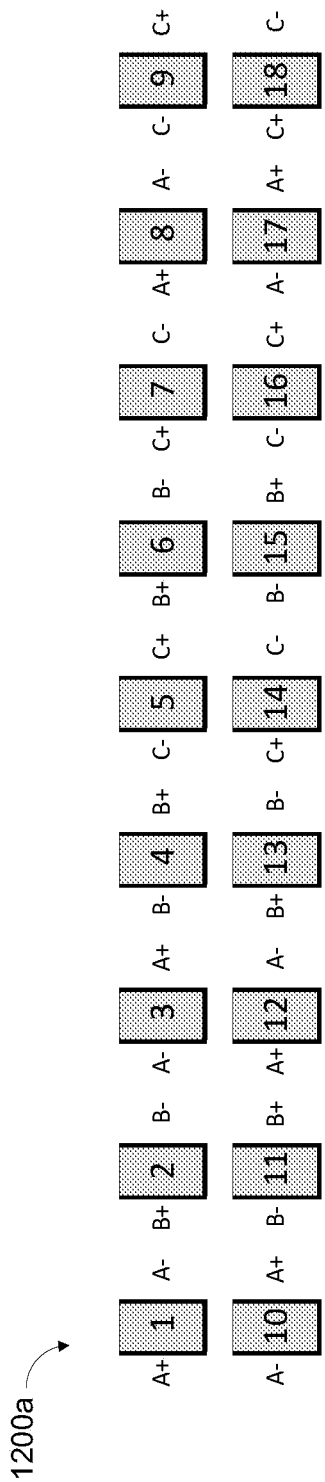
FIG. 12A illustrates an example schematic of a winding configuration for a reluctance motor with eighteen stator teeth and ten rotor teeth in accordance with an embodiment.
Figure 12B:
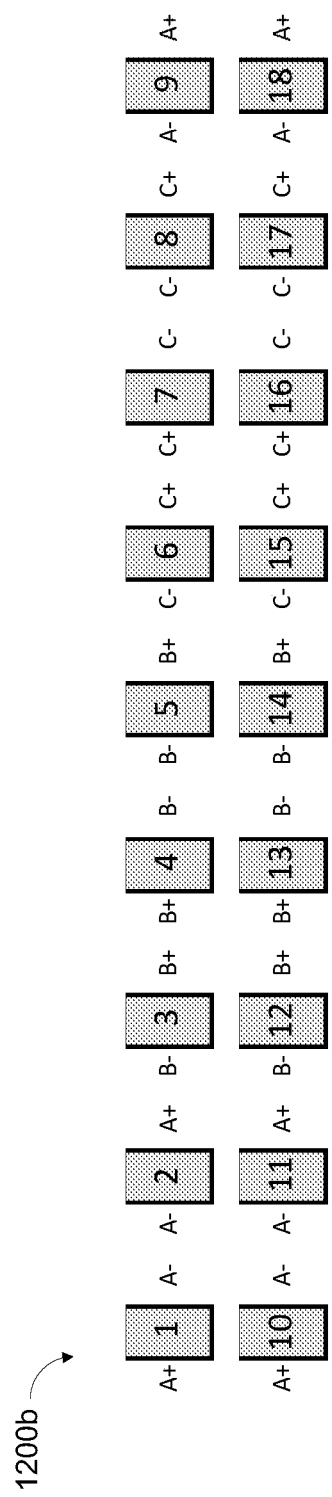
FIG. 12B illustrates an example schematic of a winding configuration for a reluctance motor with eighteen stator teeth and sixteen rotor teeth in accordance with an embodiment.

FIGS. 12A and 12B illustrate examples of phase coil winding configurations for various three-phase reluctance machines having eighteen (18) salient stator teeth. The phase coil winding configurations shown in FIGS. 12A and 12B define a current linkage waveform having a number of pulses that results in the number of half-poles/half-cycles corresponding to the number of rotor teeth in each example reluctance machine configuration.

Various alternative winding configurations may be used in other embodiments of three-phase various reluctance machines having eighteen (18) salient stator teeth so long as the current linkage waveform that results when the coils are excited by an alternating current includes the number of half-cycles corresponding to the number of rotor teeth.

FIG. 12A illustrates an example phase coil winding configuration for a reluctance motor having eighteen salient stator teeth and ten salient rotor teeth in accordance with an embodiment. Each stator tooth has a corresponding phase winding section of one of the phase coils wound about that stator tooth. In the example of FIG. 12A, the three phase coils are wound around the plurality of salient stator teeth to define a current linkage waveform having ten half-cycles when the phase coils are energized.

FIG. 12B illustrates an example phase coil winding configuration for a reluctance motor having eighteen salient stator teeth and sixteen salient rotor teeth in accordance with an embodiment. Each stator tooth has a corresponding phase winding section of one of the phase coils wound about that stator tooth. In the example of FIG. 12B, the three phase coils are wound around the plurality of salient stator teeth to define a current linkage waveform having sixteen half-cycles when the phase coils are energized.

Figure 13:
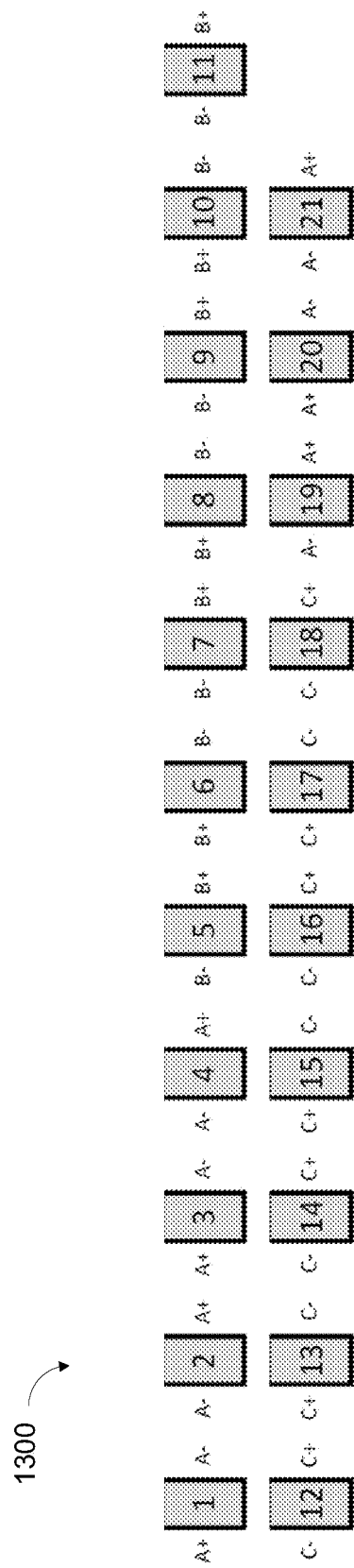
FIG. 13 illustrates an example schematic of a winding configuration for a reluctance motor with twenty-one stator teeth and twenty rotor teeth in accordance with an embodiment.

FIG. 13 illustrates an example phase coil winding configuration for a three-phase reluctance motor having twenty-one salient stator teeth and fourteen salient rotor teeth in accordance with an embodiment. Each stator tooth has a corresponding phase winding section of one of the phase coils wound about that stator tooth. In the example of FIG. 13, the three phase coils are wound around the plurality of salient stator teeth to define a current linkage waveform having fourteen half-cycles when the phase coils are energized.

Various alternative winding configurations may be used in other embodiments of three-phase various reluctance machines having twenty-one (21) salient stator teeth so long as the current linkage waveform that results when the coils are excited by an alternating current includes the number of half-cycles corresponding to the number of rotor teeth.

Figure 14:
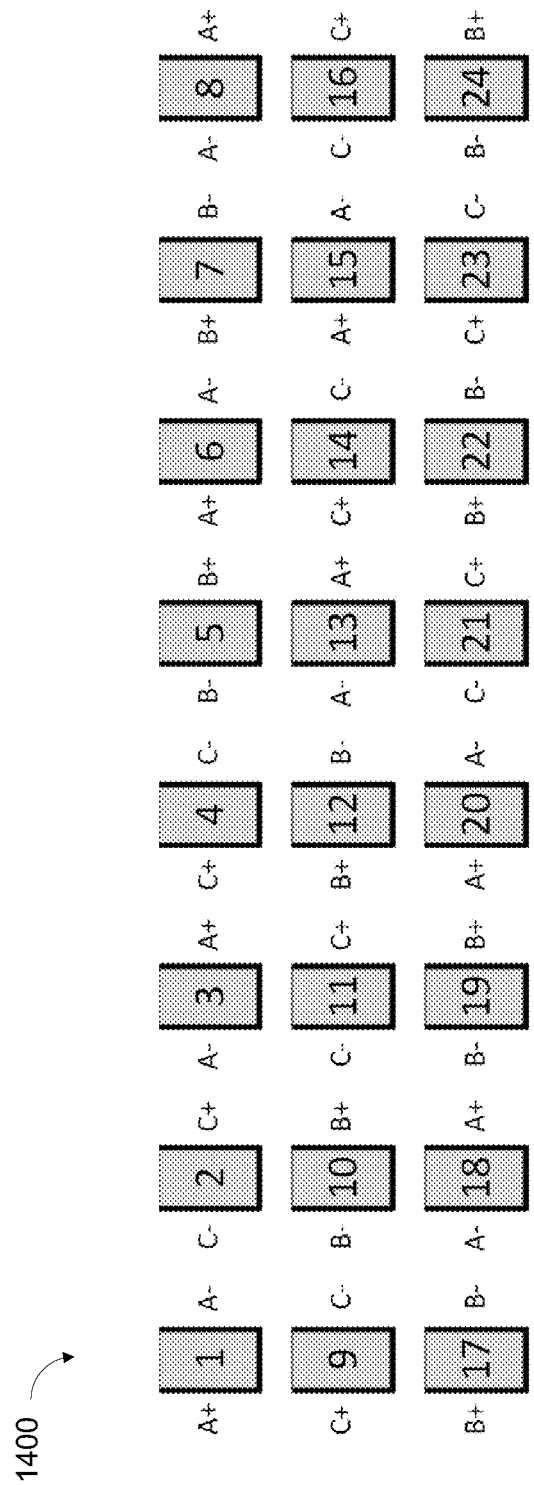
FIG. 14 illustrates an example schematic of a winding configuration for a reluctance motor with twenty-four stator teeth and ten rotor teeth in accordance with an embodiment.

FIG. 14 illustrates an example phase coil winding configuration for a three-phase reluctance motor having twenty-four salient stator teeth and ten salient rotor teeth in accordance with an embodiment. Each stator tooth has a corresponding phase winding section of one of the phase coils wound about that stator tooth. In the example of FIG. 14, the three phase coils are wound around the plurality of salient stator teeth to define a current linkage waveform having ten half-cycles when the phase coils are energized.

Various alternative winding configurations may be used in other embodiments of three-phase various reluctance machines having twenty-four (24) salient stator teeth so long as the current linkage waveform that results when the coils are excited by an alternating current includes the number of half-cycles corresponding to the number of rotor teeth.

Embodiments described herein generally relate to reluctance machines having both salient rotor teeth and salient stator teeth. The coil windings around the stator teeth can be wound in a concentrated manner around individual stator teeth and configured to enable alternating current to drive the reluctance machines. The windings can be arranged to define the magnetic flux density distribution in the air gap of the reluctance to include a number of half cycles equal to the number of rotor teeth. The reluctance machines described in the embodiments herein may be applied in various motor drive systems, including powertrain applications, household appliances, drones, and tools for example.

The coil windings arrangements shown and described herein are configured so that when excited with multi-phase alternating current, the number of half-cycle in the magnetic flux density distribution in the airgap is equal to the number of rotor teeth. The invention described herein are not limited to the specific example winding configurations shown herein, but can be expanded to any suitable winding configuration that generates the number of half-cycle equal to the number of rotor teeth. Additionally, the invention described herein is not limited to the examples of the number of stator teeth, rotor teeth and phases specifically described herein.

While the present application has been described with reference to examples, it is to be understood that the scope of the claims should not be limited by the embodiments set forth in the examples, but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

The invention claimed is:

1. A reluctance motor comprising:
   a stator having a stator core and a plurality of salient stator teeth protruding radially from the stator core;
   a rotor concentrically disposed with the stator, the rotor having a rotor core and a plurality of salient rotor teeth protruding radially from the rotor core towards the stator teeth;
   a plurality of electrical windings arranged on the stator teeth, the plurality of electrical windings including a plurality of separate phase windings defining single three phases, wherein the three phases define all phases of the plurality of electrical windings;
   a three-phase inverter;
   a power source coupled to the plurality of electrical windings by the three-phase inverter; and
   a controller operable to energize the electrical windings using power supplied from the power source via the three-phase inverter wherein the electrical windings are energized using an alternating current,
   wherein each phase winding has a phase winding input and a phase winding output, and each phase winding input and each phase winding output is coupled to the power source by the three-phase inverter, and
   wherein each phase winding includes a plurality of phase coil winding sections and at least one linking section, wherein each phase coil winding section comprises a concentrated winding that is wound about a different one of the stator teeth,
   wherein for each phase winding, the phase coil winding sections of that phase winding are joined in a sequence by the at least one linking section of that phase winding to form a current path between the phase winding input and the phase winding output, wherein phase coil winding sections that are sequentially adjacent in the sequence are joined by a corresponding linking section in the at least one linking section, and
   wherein the plurality of electrical windings are arranged on the stator teeth to define, at a given time instance, when excited by the alternating current, a current linkage waveform of the reluctance motor having a sinusoidal-type distribution of fundamental harmonic that includes a number of half-cycles equal to the number of salient rotor teeth, and
   wherein an air gap is provided between the salient rotor teeth and the salient stator teeth, and a magnetic flux appears spatially around the air gap as a result of the current linkage waveform, and wherein at a given time instance, the magnetic flux is characterized by a magnetic flux density distribution having the sinusoidal-type distribution of fundamental harmonic that includes the number of half-cycles being equal to the number of salient rotor teeth.

2. The reluctance motor of claim 1 wherein the alternating current has a sinusoidal waveform.

3. The reluctance motor of claim 1, wherein at least one phase winding includes a pair of adjacent phase coil winding sections, the adjacent phase coil winding sections being wound about adjacent stator teeth.

4. The reluctance motor of claim 3, wherein the pair of adjacent phase coil winding sections includes a first phase coil winding section that is wound about a first corresponding stator tooth to define a first direction of current flow around the first corresponding stator tooth and a second phase coil winding section that is wound about a second corresponding stator tooth adjacent to the first corresponding stator tooth to define a second direction of current flow about the second corresponding stator tooth, wherein at any time instance when the current flow is non-zero, the first direction of current flow is opposite from the second direction of current flow.

5. A reluctance motor comprising:
   a stator having a plurality of salient stator teeth;
   a rotor concentrically disposed with the stator, the rotor having a plurality of salient rotor teeth; and
   a plurality of electrical windings arranged around the stator teeth, the plurality of electrical winding including a plurality of separate phase windings defining single three phases, wherein the three phases define all phases of the plurality of electrical windings,
   wherein each phase winding has a phase winding input and a phase winding output, and each phase winding input and each phase winding output is coupled to a power source of the reluctance motor; and
   wherein each phase winding includes a plurality of phase coil winding sections and at least one linking section, wherein each phase coil winding section comprises a concentrated winding that is wound about a different one of the stator teeth,
   wherein for each phase winding, the phase coil winding sections of that phase winding are joined in a sequence by the at least one linking section of that phase winding to form a current path between the phase winding input and the phase winding output, wherein the phase coil winding sections of that phase winding that are sequentially adjacent in the sequence are joined by a corresponding linking section in the at least one linking section of that phase winding; and
   wherein the plurality of electrical winding are arranged on the stator teeth to define, when excited by an alternating current, at a given time instance, a current linkage waveform of the reluctance motor having a sinusoidal-type distribution of fundamental harmonic that includes a number of half-cycles equal to the number of salient rotor teeth; and wherein an air gap is provided between the salient rotor teeth and the salient stator teeth, and a magnetic flux appears spatially around the air gap as a result of the current linkage waveform, and wherein at a given time instance, the magnetic flux is characterized by a magnetic flux density distribution having the sinusoidal-type distribution of fundamental harmonic that includes the number of half-cycles being equal to the number of salient rotor teeth.

6. The reluctance motor of claim 5, further comprising a controller and an inverter, the power source being coupled to the plurality of electrical windings via the inverter, and the controller being operable to energize the electrical windings using power supplied from the power source via the inverter, wherein the electrical windings are energized using the alternating current.

7. The reluctance motor of claim 6, wherein the alternating current has a sinusoidal waveform.

8. The reluctance motor of claim 5, wherein at least one phase winding includes a pair of adjacent phase coil winding sections, the adjacent phase coil winding sections being would about adjacent stator teeth.

9. The reluctance motor of claim 8, wherein the pair of adjacent phase coil winding sections includes a first phase coil winding section that is wound about a first corresponding stator tooth to define a first direction of current flow around the first corresponding stator tooth and a second phase coil winding section that is wound about a second corresponding stator tooth adjacent to the first corresponding stator tooth to define a second direction of current flow about the second corresponding stator tooth, wherein at any time instance when the current flow is non-zero, the first direction of current flow is opposite from the second direction of current flow.

10. The reluctance motor of claim 5, further comprising a multi-phase inverter coupling the plurality of phase coils to the power source.

* * * * *